(12) United States Patent
Ringdahl

(10) Patent No.: US 6,476,984 B1
(45) Date of Patent: Nov. 5, 2002

(54) RAZOR MAGNIFYING GLASS

(76) Inventor: Danny P. Ringdahl, 750 N. Atlantic Ave. Ste. 1209, Cocoa Beach, FL (US) 32931

( * ) Notice: Subject to any disclaimer, the term of this patent is extended or adjusted under 35 U.S.C. 154(b) by 0 days.

(21) Appl. No.: 09/659,047

(22) Filed: Sep. 11, 2000

(51) Int. Cl.7 .................. G02B 27/02; G02B 27/00; B26B 19/00; B26B 21/40; A45D 27/22
(52) U.S. Cl. .............. 359/803; 359/809; 30/34.05; 30/537; 132/289
(58) Field of Search ............................. 359/802, 803, 359/809, 838; 30/34.05, 32, 123, 526, 537; 132/289; 362/115

(56) References Cited

U.S. PATENT DOCUMENTS

| | | | | |
|---|---|---|---|---|
| 1,676,183 A | * | 7/1928 | Garfunkle | 362/115 |
| 1,762,809 A | | 6/1930 | Bradford | 379/450 |
| 1,765,366 A | | 6/1930 | Crater | 606/131 |
| 1,842,403 A | | 1/1932 | Hunsaker | 606/131 |
| 2,341,743 A | * | 2/1944 | Rothner | 30/34.05 |
| 2,732,761 A | | 1/1956 | Bender | 359/810 |
| 3,510,204 A | | 5/1970 | Jack | 359/810 |
| 3,680,210 A | | 8/1972 | Steinman | 30/28 |
| 3,744,883 A | | 7/1973 | Williams | 359/810 |
| 4,398,800 A | | 8/1983 | Hayes | 359/818 |
| 4,847,901 A | | 7/1989 | Grant | 379/450 |
| 5,150,261 A | | 9/1992 | Tsai | 359/810 |
| 5,604,633 A | * | 2/1997 | Christianson | 359/507 |
| 5,692,529 A | * | 12/1997 | Fekete | 132/291 |
| 5,913,317 A | * | 6/1999 | Tiram | 132/291 |

FOREIGN PATENT DOCUMENTS

FR 2414388 A * 9/1979 ........... B26B/19/38

* cited by examiner

Primary Examiner—Hung Xuan Dang
Assistant Examiner—Gary O'Neill
(74) Attorney, Agent, or Firm—Paul S. Rooy

(57) ABSTRACT

A razor magnifying glass having a magnifying lens adjustably attached to a handle clamp. The handle clamp is sized to attach to a razor. The razor magnifying glass may incorporate an extension shaft, the magnifying lens being adjustably attached to one extreme of the extension shaft, and the handle clamp being adjustably attached to another extreme of the extension shaft. The handle clamp may be a frictional handle clamp which incorporates a frictional handle clamp aperture sized to frictionally admit a razor handle. An alternate embodiment razor magnifying glass incorporates a spring handle clamp having a pair of mutually opposed spring handle clamp arms embracing a spring handle clamp aperture. The spring handle clamp aperture is sized to frictionally admit a razor handle, and the spring handle clamp arms are made of resilient material. Another alternate embodiment razor magnifying glass incorporates a gooseneck extension shaft, capable of being adjusted into complex curved shapes, and of retaining its shape after adjustment. Also disclosed is a rotatable extension shaft attachment, whereby the magnifying lens may be rotated around the razor handle, and a telescoping extension shaft which provides even greater adjustability.

20 Claims, 6 Drawing Sheets

RAZOR MAGNIFYING GLASS

BACKGROUND OF THE INVENTION

1. Field of the Invention

This invention relates to shaving apparatus, and in particular to a razor magnifying glass.

2. Background of the Invention

For millennia man has used different apparatus to shave his beard. There are many reasons for so doing: cleanliness, comfort in hot summer months, and aesthetic reasons, to name a few. In addition, many women have adopted the custom of shaving their legs, arms, etc. Over the passage of time, the shaving equipment has changed.

The first razors may have been sharpened stones, created around the same time as sharpened stone arrowheads and spearheads. When man learned to work metal, sharpened metal blades were doubtlessly used for shaving purposes.

Sharpened metal razors are still used today. Two examples of these are the straight edge razor and the safety razor. Straight edge razors comprise a tempered steel blade generally about three or four inches long hingedly attached to a handle by means of a rivet or other appropriate fastener. The blade folds into the handle when not in use. The best straight edged razors have traditionally been made in Sheffield, England, although many quality straight edged razors are now made elsewhere.

Safety razors employ sharpened steel bands cut to size called razor blades. These may be installed into the safety razor, used until no longer sharp enough to shave effectively, and then replaced with another blade. Today, many safety razors are made to be disposable. One such disposable razor 2 is illustrated in FIG. 1. Disposable razor 2 comprises disposable razor head attached to disposable razor handle 4. Disposable razor blade(s) 8 are attached to disposable razor head 6. It is not uncommon to have two disposable razor blades 8 attached to disposable razor head 6, in order to provide a closer shave.

One problem associated with shaving is the difficulty of getting a really clear view of what the razor blade is actually shaving. The Jun. 12, 2000 Time Magazine pointed out that as the millions of Baby Boomers age, the most noticeable effects during their middle 40's tend to be an increasing girthline, declining memory, and reduced eyesight. Thus, it would be advantageous to provide a mean of enhancing the view of shaving activities, not only for aging individuals, but also to afford a more accurate shave to all individuals who shave, both men and women.

SUMMARY OF THE INVENTION

Accordingly, it is an object of the present invention to provide a razor magnifying glass which magnifies the area a user is shaving. Design features allowing this object to be accomplished include a magnifying lens attached to a razor by means of an extension shaft. Advantages associated with the accomplishment of this object include a better view of an area being shaved, and consequently a more accurate shave and reduced chance of personal injury.

It is another object of the present invention to provide a razor magnifying glass which provides a magnifying lens whose position is adjustable relative to the razor blade(s). Design features allowing this object to be accomplished include to a razor handle adjustably attached to one extreme of an extension shaft, and a lens adjustably attached to an opposite extreme of the extension shaft. The extension shaft may be a telescoping extension shaft, and the adjustable attachment between the extension shaft and the razor handle may be a rotatable extension shaft attachment. Benefits associated with the accomplishment of this object include accurate placement of the magnifying lens in order to provide the best possible view of the shaving activity, and the consequently more accurate shave and reduced chance of personal injury.

It is yet another object of this invention to provide a razor magnifying glass which is inexpensive and easy to make. Design features allowing this object to be achieved include the use of components made of readily available and off-the-shelf materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIG. 1. Sheet two contains FIG. 2. Sheet three contains FIG. 3. Sheet four contains FIG. 4.

DETAILED DESCRIPTION OF THE PREFERRED EMBODIMENT

Figure 1:
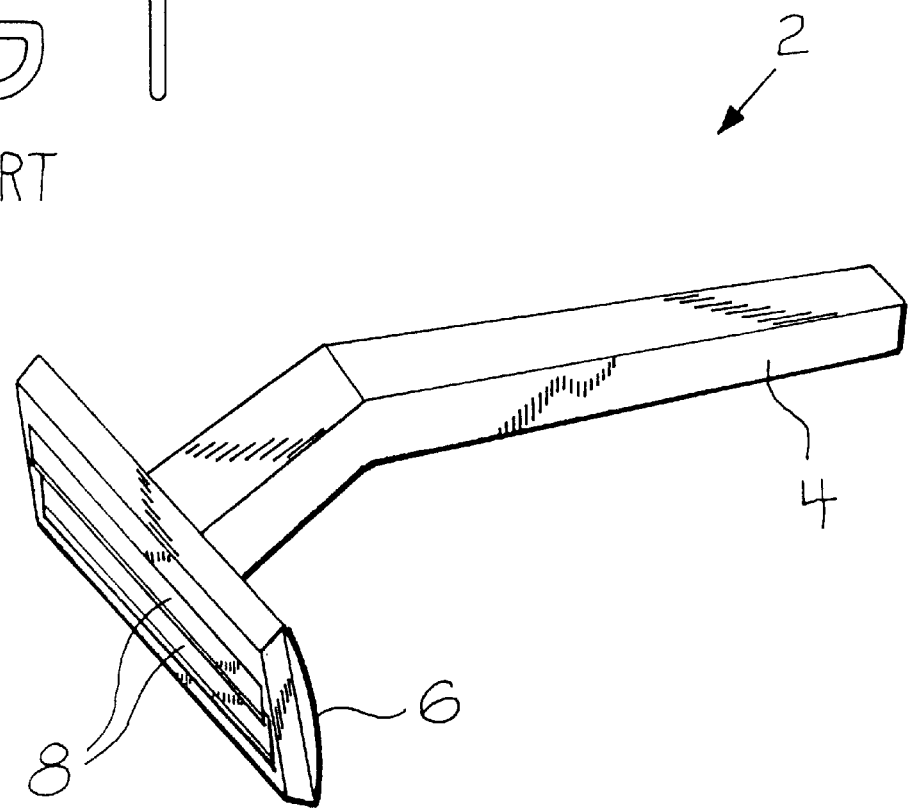
FIG. 1 is a side quarter isometric view of a prior art disposable razor.
Figure 2:
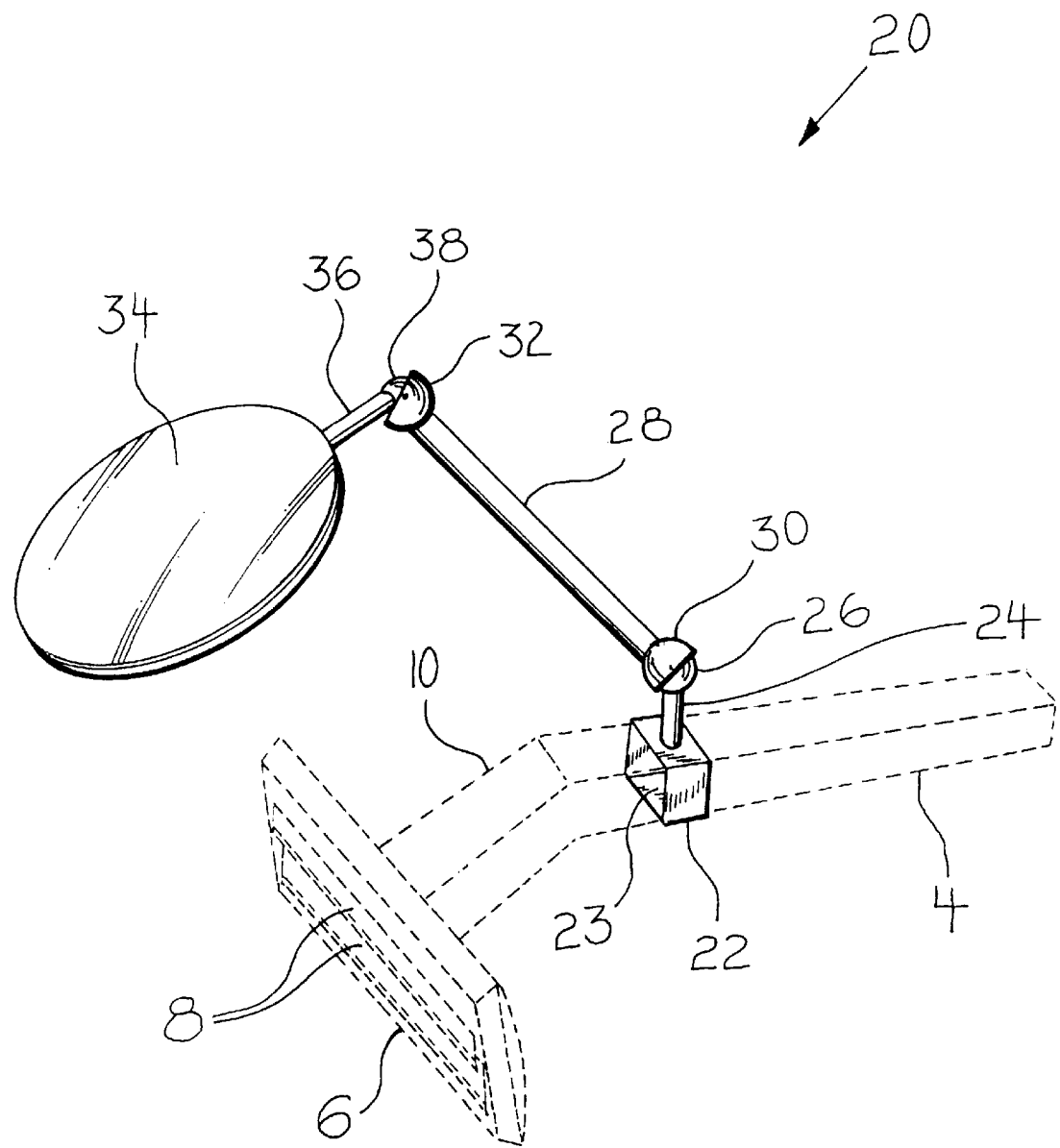
FIG. 2 is a side quarter isometric view of a razor magnifying glass installed on a razor by means of a frictional handle clamp.

FIG. 2 is a side quarter isometric view of razor magnifying glass 20 installed on a razor handle 4 by means of frictional handle clamp 22. Razor magnifying glass 20 comprises frictional handle clamp 22 adjustably attached to one extreme of extension shaft 28, and magnifying lens 34 adjustably attached to an opposite extreme of extension shaft 28. In FIG. 2 razor 10 is shown to be a disposable razor, although it is envisioned to be within the scope of the instant invention that razor 10 may be any appropriate razor, such as a non-disposable safety razor, etc.

In the embodiment depicted in FIG. 2, the adjustability of magnifying lens 3 4 relative to razor 10 is provided by magnifying lens shaft ball 38 within extension shaft upper socket 32, and by handle clamp ball 26 within extension shaft lower socket 30. Magnifying lens 34 is attached to one extreme of magnifying lens shaft 36, and magnifying lens shaft ball 38 is attached to an extreme of magnifying lens shaft 36 opposite from magnifying lens 34. Extension shaft upper socket 32 is attached to one extreme of extension shaft 28, and extension shaft lower socket 30 is attached to an extreme of extension shaft 28 opposite extension shaft upper socket 32. Handle clamp ball 26 is attached to one extreme of handle clamp shaft 24, and frictional handle clamp 22 is attached to an extreme of handle clamp shaft 24 opposite handle clamp ball 26. Magnifying lens shaft ball 38 is sized to frictionally mate with extension shaft upper socket 32, and handle clamp ball 26 is sized to frictionally mate with extension shaft lower socket 30.

The embodiment razor magnifying glass 20 illustrated in FIG. 2 attaches to razor handle 4 by means of frictional handle clamp 22. Frictional handle clomp 22 comprises frictional handle clamp aperture 23 sized to frictionally admit razor handle 4. In order to install the razor magnifying glass 20 embodiment depicted in FIG. 2 onto razor 10, razor handle 4 is inserted into frictional handle clamp aperture 23, and slid until frictional handle clamp 22 is at the desired position on razor handle 4. At that time the frictional nature of the fit between frictional handle clamp 22 and razor handle 4 maintains frictional handle clamp 22 in the desired position on razor handle 4.

Figure 3:
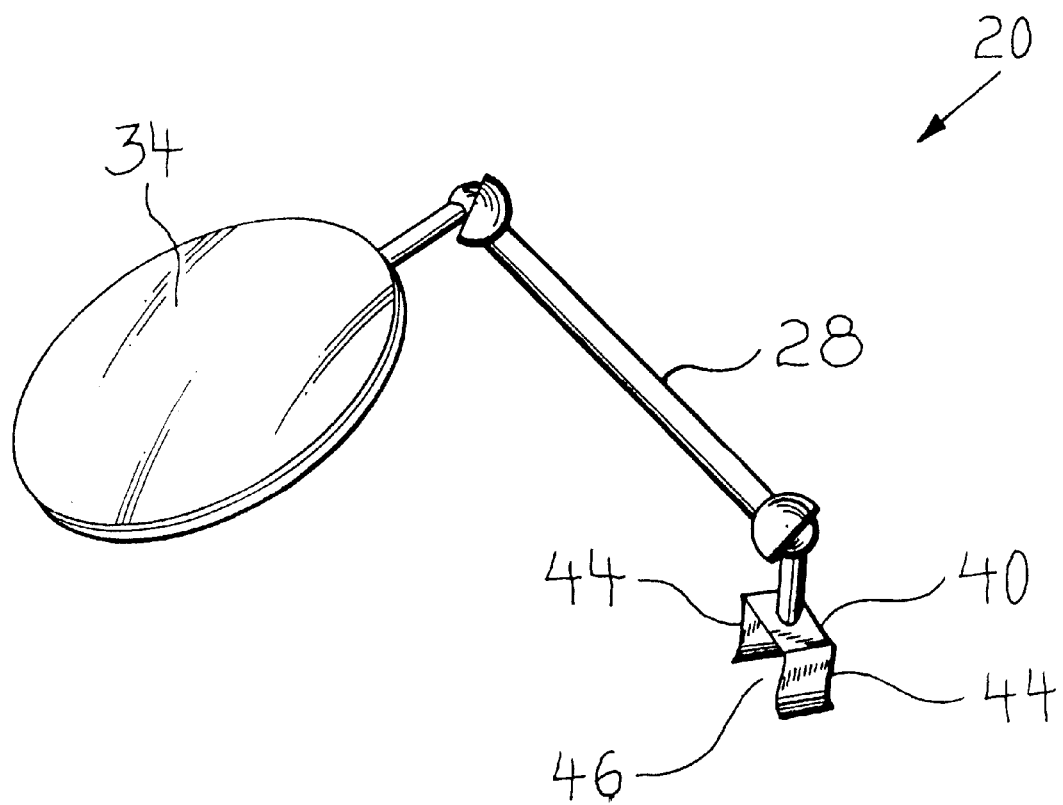
FIG. 3 is a side quarter isometric view of a razor magnifying glass incorporating a spring handle clamp.

Although the ball-in-socket installation depicted in FIGS. 2 and 3 show sockets 30, 32 installed on extension shaft 28, and balls 26, 38 installed on handle clamp shaft 24 and magnifying lens shaft 36 respectively, it is envisioned to be within the scope of the instant invention that one or more of the balls be installed on extension shaft 28, and the corresponding socket(s) be installed on magnifying lens shaft 36 and/or handle clamp shaft 24.

In use, after razor magnifying glass 20 has been installed on razor 10, magnifying lens 34 is adjusted into the position desired by means of the upper and lower ball-in-socket arrangements attached to extension shaft 28. The user can then observe his shaving activity through magnifying lens 34 as reflected in a mirror. In this fashion, the user is be able to see the effects of razor 10 with great clarity, and increase the accuracy of his or her shaving.

FIG. 3 is a side quarter isometric view of an alternate embodiment razor magnifying glass 20 incorporating spring handle clamp 40. Spring handle clamp 40 comprises a pair of opposed spring handle clamp arms 44 which embrace spring handle clamp aperture 46. Spring handle clamp arms 44 are made of resilient material such as spring metal, plastic, nylon, or other appropriate material. Spring handle clamp aperture 46 is sized to frictionally admit razor handle 4.

The embodiment razor magnifying glass 20 depicted in FIG. 3 is installed onto razor 10 by simply pushing spring handle clamp arms 44 around razor handle 4 at the desired location on razor handle 4, until razor handle 4 is securely seated in spring handle clamp aperture 46. At that time the frictional nature of the fit between resilient spring handle clamp arms 44 and razor handle 4 maintains razor magnifying glass 20 securely installed on razor 10 in the desired position on razor handle 4.

Figure 4:
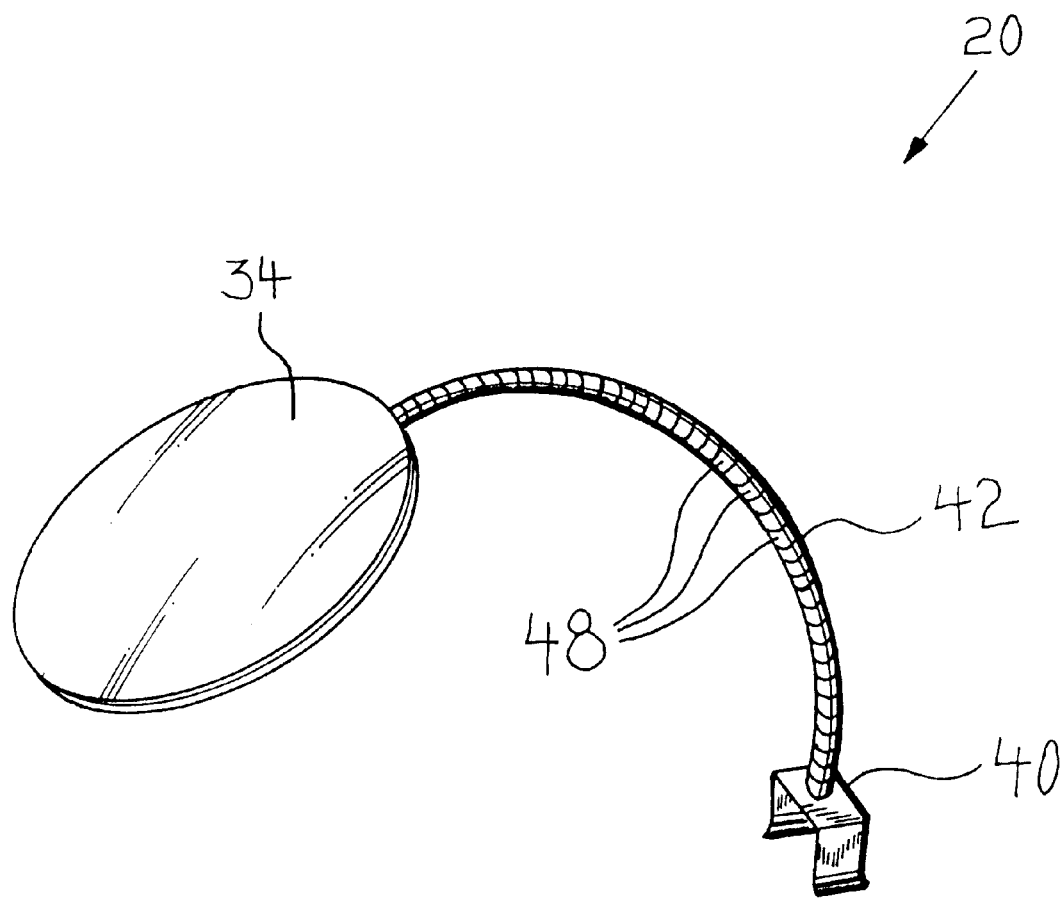
FIG. 4 is a side quarter isometric view of a razor magnifying glass incorporating a gooseneck extension shaft.

FIG. 4 is a side quarter isometric view of a razor magnifying glass 20 embodiment incorporating gooseneck extension shaft 42. Gooseneck extension shaft 42 is made of a series of frictionally attached gooseneck annuli 48, which allow gooseneck extension shaft 42 to articulate and assume complex shapes much like the long neck of a swan. In use, a user to bends gooseneck extension shaft 42 into the shape desired so as to correctly locate magnifying lens 34, and the frictional nature of the fit between the succeeding gooseneck annuli 48 causes gooseneck 42 to retain its shape.

Figure 5:
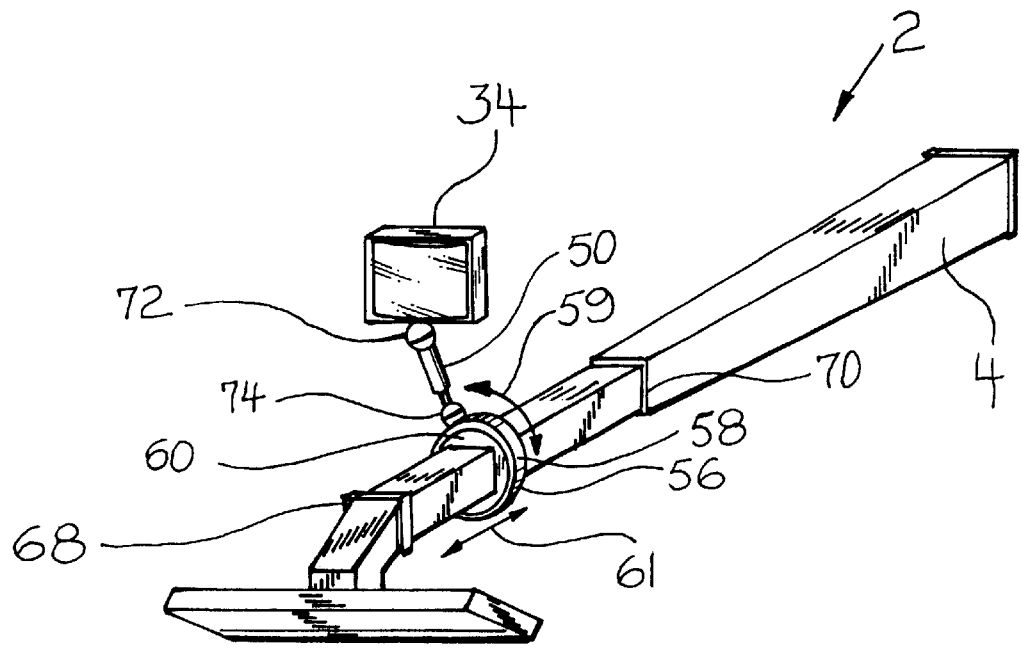
FIG. 5 is a side quarter isometric view of a razor magnifying glass incorporating a telescoping extension shaft and a rotatable extension shaft attachment.
Figure 6:
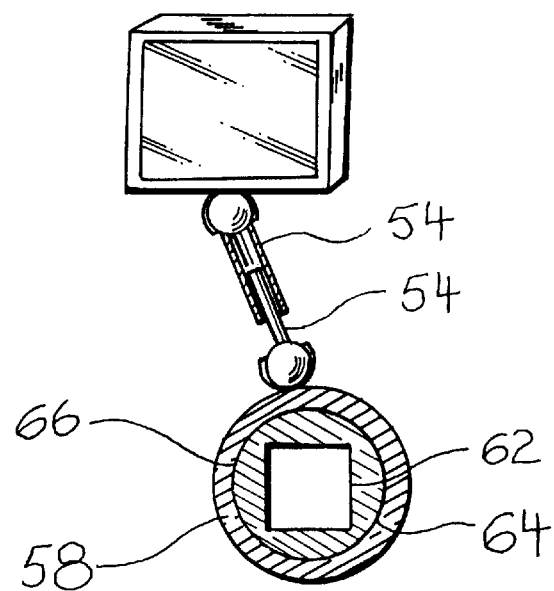
FIG. 6 is a front cross-sectional view of a razor magnifying glass incorporating a telescoping extension shaft and a rotatable extension shaft attachment.
Figure 7:
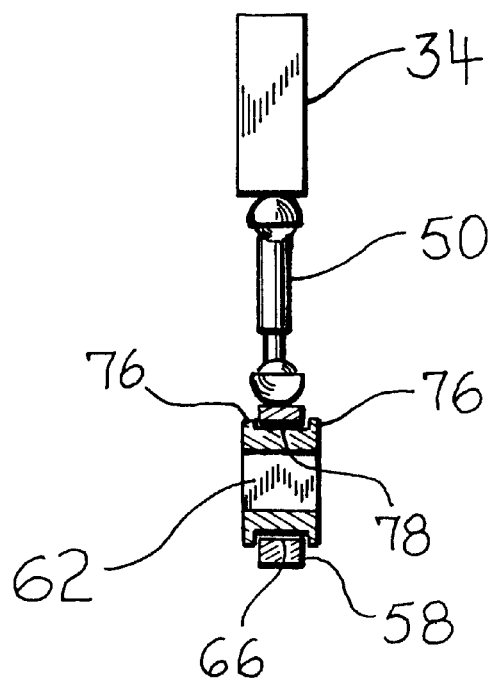
FIG. 7 is a side cross-sectional view of a razor magnifying glass incorporating a telescoping extension shaft and a rotatable extension shaft attachment.

FIG. 5 is a side quarter isometric view of razor magnifying glass 20 incorporating telescoping extension shaft 50. Razor magnifying glass 20 is adjustably attached to razor handle 4 by means of rotatable extension shaft attachment 56. As may also be observed in FIGS. 6 and 7, telescoping extension shaft 50 comprises at least two frictionally engaged telescoping extension shaft sections 54. In this manner the length of telescoping extension shaft 50 may be varied to permit optimum placement of magnifying lens 34. Only two telescoping extension shaft sections 54 are depicted in FIGS. 5–8 for simplicity, but it is considered to be within the scope of this invention to use a telescoping extension shaft 50 comprising more than two telescoping extension shaft sections 54.

Rotatable extension shaft attachment 56 comprises base 60 and annulus 58. Telescoping extension shaft 50 may be attached to annulus 58 by means of lower ball-in-socket 74, and to magnifying lens 34 by means of upper bass-in-socket 72. A cross-sectional outside shape of base 60 is circular. Base 60 comprises base race 64 disposed about its outer, circular surface. Annulus 58 comprises annulus bore 66 sized to frictionally admit base race 64. The outside surface of base 60 comprises base race groove 78, bordered at either side by a base race lip 76. Thus annulus 58 is free to frictionally rotate about base race 64 as indicated by arrow 59, and is constrained from slipping off base 58 by means of base race lips 76.

Base 60 further comprises base aperture 62, sized to frictionally admit the section of razor handle 4 which is disposed between first stop 68 and second stop 70. Thus, base 60 is free to frictionally translate along razor handle 4 between first stop 68 and second stop 70 as indicted by arrow 61. The translational motion of base 60 along razor handle 4 is constrained at one end of travel by first stop 68, and at the opposite end of travel by second stop 70.

In this manner, the distance of magnifying lens 34 from razor handle 4 may be adjusted by means of telescoping extension shaft 50; the angular orientation of magnifying lens 34 relative to razor 2 and the disposition of magnifying lens 34 along the length of razor 2, may be adjusted by means of rotatable extension shaft attachment 56. Lower ball-in-socket 74 and upper ball-in-socket 72 provide still further adjustability to the position of magnifying lens 34 relative to razor 2. In this manner the placement of magnifying lens 34 can be optimized for focus and best view of the area being shaved.

Figure 8:
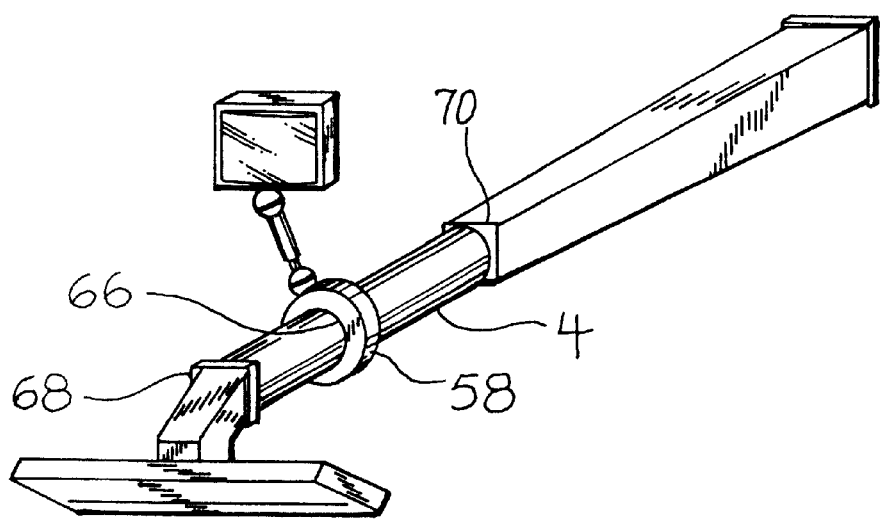
FIG. 8 is a side quarter isometric view of a razor magnifying glass incorporating a telescoping extension shaft and a rotatable extension shaft attachment on a round razor handle section.

FIG. 8 is a side quarter isometric view of razor magnifying glass 20 incorporating telescoping extension shaft 50 rotatably attached to round razor handle 4. In this embodiment, rotatable extension shaft attachment 56 comprises only annulus 58 whose annulus bore 66 is sized to frictionally admit that round portion of razor handle 4 which is disposed between first stop 68 and second stop 70.

It is important to note that the fit between successive telescoping extension sections 54 is frictional; the fit between annulus bore 66 and base race 64 is frictional; the fit between base aperture 62 and razor handle 4 is frictional; and in the embodiment of FIG. 8 the fit between annulus bore 66 and the round section of razor handle 4 is frictional. Thus when magnifying lens 34 is placed in a given position relative to razor 2, it will tend to stay in that relative position until later intentionally re-positioned.

In the preferred embodiment, magnifying lens 34 was a commercially available, off-the-shelf magnifying lens. Magnifying lens shaft 36, magnifying lens shaft ball 38, extension shaft upper socket 32, extension shaft 28, telescoping extension shaft 58, extension shaft lower socket 30, rotatable extension shaft attachment 56, handle clamp ball 26, handle clamp shaft 24, frictional handle clamp 22 and spring handle clamp 40 were made of metal, plastic, nylon, other synthetic, or other appropriate material. Gooseneck extension shaft 42 was made of commercially available, off-the-shelf gooseneck material.

While a preferred embodiment of the invention has been illustrated herein, it is to be understood that changes and variations may be made by those skilled in the art without departing from the spirit of the appending claims.

Drawing Item Index

2 disposable razor
4 razor handle
6 razor head
8 razor blade
10 razor
20 razor magnifying glass
22 frictional handle clamp
23 frictional handle clamp aperture
24 handle clamp shaft
26 handle clamp ball
28 extension shaft
30 extension shaft lower socket
32 extension shaft upper socket
34 magnifying lens
36 magnifying lens shaft
38 magnifying lens shaft ball
40 spring handle clamp
42 gooseneck extension shaft
44 spring handle clamp arm
46 spring handle clamp aperture
48 gooseneck annulus
50 telescoping extension shaft
54 telescoping extension shaft section
56 rotatable extension shaft attachment
58 annulus
59 arrow
60 base
61 arrow
62 base aperture
64 base race
66 annulus bore
68 first stop
70 second stop
72 upper ball-in-socket
74 lower ball-in-socket
76 base race lip
78 base race groove

I claim:

1. A razor magnifying glass comprising a magnifying lens attached to one end of a rigid extension shaft by means of a first ball in socket, and a handle clamp sized to fit a razor handle attached to an opposite end of said rigid extension shaft by means of a second ball in socket.

2. The razor magnifying glass of claim 1 wherein said handle clamp is a frictional handle clamp comprising a frictional handle clamp aperture, said frictional handle clamp aperture being sized to frictionally admit a razor handle, whereby said razor magnifying glass may be securely held in position on a razor.

3. The razor magnifying glass of claimed 1 wherein said handle clamp is a spring handle clamp comprising a pair of mutually opposed spring handle clamp arms embracing a spring handle clamp aperture, said spring handle clamp arms being made of resilient material, said spring handle clamp aperture being sized to frictionally admit a razor handle, whereby said razor magnifying glass may be securely held in position on a razor.

4. The razor magnifying glass of claim 1 further comprising a magnifying lens shaft and a handle clamp shaft, said magnifying lens being attached to one extreme of said magnifying lens shaft and a magnifying lens shaft ball being attached to an extreme of said magnifying lens shaft opposite from said magnifying lens, an extension shaft upper socket attached to one extreme of said extension shaft, an extension shaft lower socket attached to an extreme of said extension shaft opposite said extension shaft upper socket, a handle clamp ball attached to one extreme of said handle clamp shaft, said frictional handle clamp being attached to an extreme of said handle clamp shaft opposite said handle clamp ball, said magnifying lens shaft ball disposed within and frictionally mating with said extension shaft upper socket, and said handle clamp ball disposed within and frictionally mating with said extension shaft lower socket.

5. In combination a razor magnifying glass and a razors, said razor magnifying glass comprising a magnifying lens attached to one end of a rigid extension shaft by means of a fist ball in socket, and a handle clamp attached to an opposite end of said rigid extension shaft by means of a second ball in socket, said handle clamp being sized to mount onto a razor handle.

6. The combination razor magnifying glass and razor of claim 5 wherein said handle clamp is a frictional handle clamp comprising a frictional handle clamp aperture, said frictional handle clamp aperture being sized to frictionally admit said razor handle, whereby said razor magnifying glass may be securely held in position on a razor.

7. The combination razor magnifying glass and razor of claim 5 wherein said handle clamp is a spring handle clamp comprising a pair of mutually opposed spring handle clamp arms embracing a spring handle clamp aperture, said spring handle clamp arms being made of resilient material, said spring handle clamp aperture being sized to frictionally admit said razor handle, whereby said razor magnifying glass may be securely held in position on a razor.

8. A razor magnifying glass adjustably attached to a razor, said razor comprising a razor handle, said razor magnifying glass comprising a magnifying lens attached to one end of an extension shaft and a rotatable extension shaft attachment attached to an opposite end of said extension shaft, said rotatable extension shaft attachment comprising a base and an annulus, said base comprising a race around its outer surface, said annulus comprising an annulus bore sized to frictionally admit said base race, said base being attached to said razor handle, said end of said extension shaft opposite said magnifying lens being attached to said annulus, whereby said magnifying lens may be rotated around said razor handle.

9. The razor magnifying glass adjustably attached to a razor of claim 8 wherein said base further comprises a base aperture sized to frictionally admit said razor handle and said razor handle is disposed within said base aperture, whereby said base may translate along a length of said razor handle.

10. The razor magnifying glass adjustably attached to a razor of claim 9 wherein said razor handle comprises a first stop and a second stop, a freedom of translational motion of said base being limited by said first stop and said second stop.

11. The razor magnifying glass adjustably attached to a razor of claim 10 wherein said base race comprises a base race groove sized to admit said annulus, and said annulus is at least partially disposed within said base race groove, whereby said annulus is prevented from slipping off said base race.

12. The razor magnifying glass adjustably attached to a razor of claim 10 wherein said base race comprises a pair of base race lips spaced far enough apart to admit said annulus, and said annulus is at least partially disposed between said base race lips, whereby said annulus is prevented from slipping off said base race.

13. A razor magnifying glass adjustably attached to a razor, said razor comprising a razor handle, said razor magnifying glass comprising a magnifying lens attached to one end of an extension shaft and a rotatable extension shaft attachment attached to an opposite end of said extension shaft, said rotatable extension shaft attachment being attached to said razor handle, at least a portion of said razor handle being round in cross-sectional shape, said rotatable extension shaft attachment comprising an annulus, said annulus comprising an annulus bore sized to frictionally admit said round razor handle portion, whereby said rotatable extension shaft attachment may translate along said round razor handle portion, and also rotate around said round razor handle portion.

14. The razor magnifying glass adjustably attached to a razor of claim 13 wherein said razor handle comprises a first stop and a second stop, a freedom of translational motion of said rotatable extension shaft attachment being limited by said first stop and said second stop.

15. A razor magnifying glass adjustably attached to a razor, said razor comprising a razor handle, said razor magnifying glass comprising a magnifying lens attached to one end of a telescoping extension shaft, and means of attaching said telescoping extension shaft to said razor handle attached to an opposite end of said telescoping extension shaft, said telescoping extension shaft comprising at least two telescoping extension shaft sections.

16. The razor magnifying glass adjustably attached to a razor of claim 15 wherein said means of attaching said telescoping extension shaft to said razor handle comprises a rotatable extension shaft attachment, whereby said magnifying lens may be rotated around said razor handle.

17. The razor magnifying glass adjustably attached to a razor of claimed 16 wherein said magnifying lens is attached to said telescoping extension shaft by means of a ball-in-socket.

18. The razor magnifying glass adjustably attached to a razor of claim 16 wherein said telescoping extension shaft is attached to said rotatable extension shaft attachment by means of a ball-in-socket.

19. A razor magnifying glass comprising a magnifying lens attached to one end of an extension shaft and a rotatable extension shaft attachment attached to an opposite end of said extension shaft, said rotatable extension shaft attachment comprising a base and an annulus, said base comprising a race around its outer surface, said annulus comprising an annulus bore sized to frictionally admit said base race, said base being sized to attach to a razor handle, and said end of said extension shaft opposite said magnifying lens being attached to said annulus, whereby said magnifying lens may be rotated around said razor handle.

20. A razor magnifying glass comprising a magnifying lens attached to one end of a telescoping extension shaft, and means of attaching said telescoping extension shaft to a razor handle attached to an opposite end of said telescoping extension shaft, said telescoping extension shaft comprising at least two telescoping extension shaft sections.

\* \* \* \* \*

UNITED STATES PATENT AND TRADEMARK OFFICE
CERTIFICATE OF CORRECTION

PATENT NO. : 6,476,984 B1
DATED : November 5, 2002
INVENTOR(S) : Danny P. Ringdahl It is certified that error appears in the above-identified patent and that said Letters Patent is hereby corrected as shown below:

Column 2,
Line 64, reads " magnifying lens 3 4 relative…" should read -- magnifying lens 34 relative… --

Column 6,
Line 21, reads "…and a razors," should read -- …and a razor, --

Column 8,
Line 9, reads "…razor of claimed 16…" should read -- …razor of claim 16… --

Signed and Sealed this

Fourth Day of March, 2003

JAMES E. ROGAN
*Director of the United States Patent and Trademark Office*